United States Patent
Wang et al.

(10) Patent No.: US 8,011,632 B2
(45) Date of Patent: Sep. 6, 2011

(54) SUPPORT STAND FOR FLAT-PANEL DISPLAY MONITOR

(75) Inventors: Jin-Xin Wang, Shenzhen (CN); Jian Li, Shenzhen (CN); Zhi-Guo Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 483 days.

(21) Appl. No.: 12/200,434

(22) Filed: Aug. 28, 2008

(65) Prior Publication Data

US 2009/0166501 A1    Jul. 2, 2009

(30) Foreign Application Priority Data

Dec. 28, 2007    (CN) .......................... 200710203541.4

(51) Int. Cl.
*E04G 3/00* (2006.01)
(52) U.S. Cl. ...................... 248/284.1; 248/917; 248/920; 361/679.06
(58) Field of Classification Search ............... 248/274.1, 248/278.1, 284.1, 919, 922–923, 280.11, 248/281.11, 291.11, 292.11, 292.13, 292.14, 248/917, 920; 361/681–683, 679.02, 679.06
See application file for complete search history.

(56) References Cited

U.S. PATENT DOCUMENTS

| | | | | |
|---|---|---|---|---|
| 6,478,275 | B1* | 11/2002 | Huang | 248/284.1 |
| 6,695,274 | B1* | 2/2004 | Chiu | 248/371 |
| 6,822,857 | B2 | 11/2004 | Jung et al. | |
| 7,404,233 | B2* | 7/2008 | Lu et al. | 16/302 |
| 7,448,583 | B2* | 11/2008 | Kim et al. | 248/278.1 |
| 7,510,155 | B2* | 3/2009 | Huang et al. | 248/278.1 |
| 7,726,616 | B2* | 6/2010 | Zhang et al. | 248/284.1 |
| 7,770,856 | B2* | 8/2010 | Depay | 248/284.1 |
| 7,810,773 | B2* | 10/2010 | Chi | 248/278.1 |
| 2003/0075653 | A1* | 4/2003 | Li | 248/274.1 |

FOREIGN PATENT DOCUMENTS

| | | |
|---|---|---|
| CN | 2566418 Y | 8/2003 |
| CN | 2651895 Y | 10/2004 |
| TW | 577514 | 2/2004 |
| TW | M318090 | 9/2007 |
| TW | M323553 | 12/2007 |

* cited by examiner

*Primary Examiner* — Tan Le
(74) *Attorney, Agent, or Firm* — Altis Law Group, Inc.

(57) ABSTRACT

A support stand for a flat-panel display monitor comprises a base member, a support mechanism, two link shafts, and an adjustable mechanism. The support mechanism comprises a support bracket and a resilient member positioned in the support bracket. The adjustable mechanism is configured for holding the flat-panel display monitor. A first end of the support bracket and first end of each shaft are rotatably connected to the base member. An second end of the support bracket and a second end of each link shaft are rotatably connected to the adjustable mechanism. The resilient member is configured to create an elastic force between the support mechanism and the link shafts so that a distance between the support mechanism and the link shafts tends to decrease.

13 Claims, 7 Drawing Sheets

SUPPORT STAND FOR FLAT-PANEL DISPLAY MONITOR

BACKGROUND

1. Field of the Invention

The present invention generally relates to support stands, particularly, to a support stand for a flat-panel display monitor.

2. Description of the Related Art

Flat-panel display monitors, such as liquid crystal display monitors, offer advantages over cathode ray tubes such as reduced size, smaller weight, and better image quality. A viewing angle and height of the flat-panel display monitor can be adjusted without moving a support stand of the flat-panel display monitor because of its small weight.

A typical support stand generally includes a bracket for attaching to the flat-panel display monitor, a rotatable bracket for fixing the bracket, an elevating mechanism, a support member, and a base member for mounting the support member. A first end of the elevating mechanism is rotatably connected to the rotatable bracket and a second end of the elevating mechanism is supported by the support member.

The elevating mechanism includes a link bracket defining a curved retaining groove. The support member includes an inner side portion and a retaining piece formed at the inner side portion corresponding to the curved retaining groove. The retaining piece of the support member engaging in the curved retaining groove of the link bracket is configured for restricting an adjusting range of the height of the flat-panel display monitor. However, the retaining piece is easily abraded or damaged by an exterior force. As a result, the flat-panel display monitor may not remain stable at the height selected by a user.

Therefore, a new support stand for a flat-panel display monitor is desired in order to overcome the above-described shortcomings.

SUMMARY

A support stand for a flat-panel display monitor, includes a base member, a support mechanism, two link shafts, and an adjustable mechanism. The support mechanism includes a support bracket and a resilient member positioned in the support bracket. The adjustable mechanism is configured for holding the flat-panel display monitor. A first end of the support bracket and a first end of each shaft are rotatably connected to the base member. A second end of the support bracket and a second end of each link shaft are rotatably connected to the adjustable mechanism. The resilient member is configured to create an elastic force between the support mechanism and the link shafts so that a distance between the support mechanism and the link shafts tends to decrease.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present support stand for a flat-panel display monitor. Moreover, in the drawings, like reference numerals designate corresponding parts throughout the several views.

DETAILED DESCRIPTION OF THE EMBODIMENTS

Figure 1:
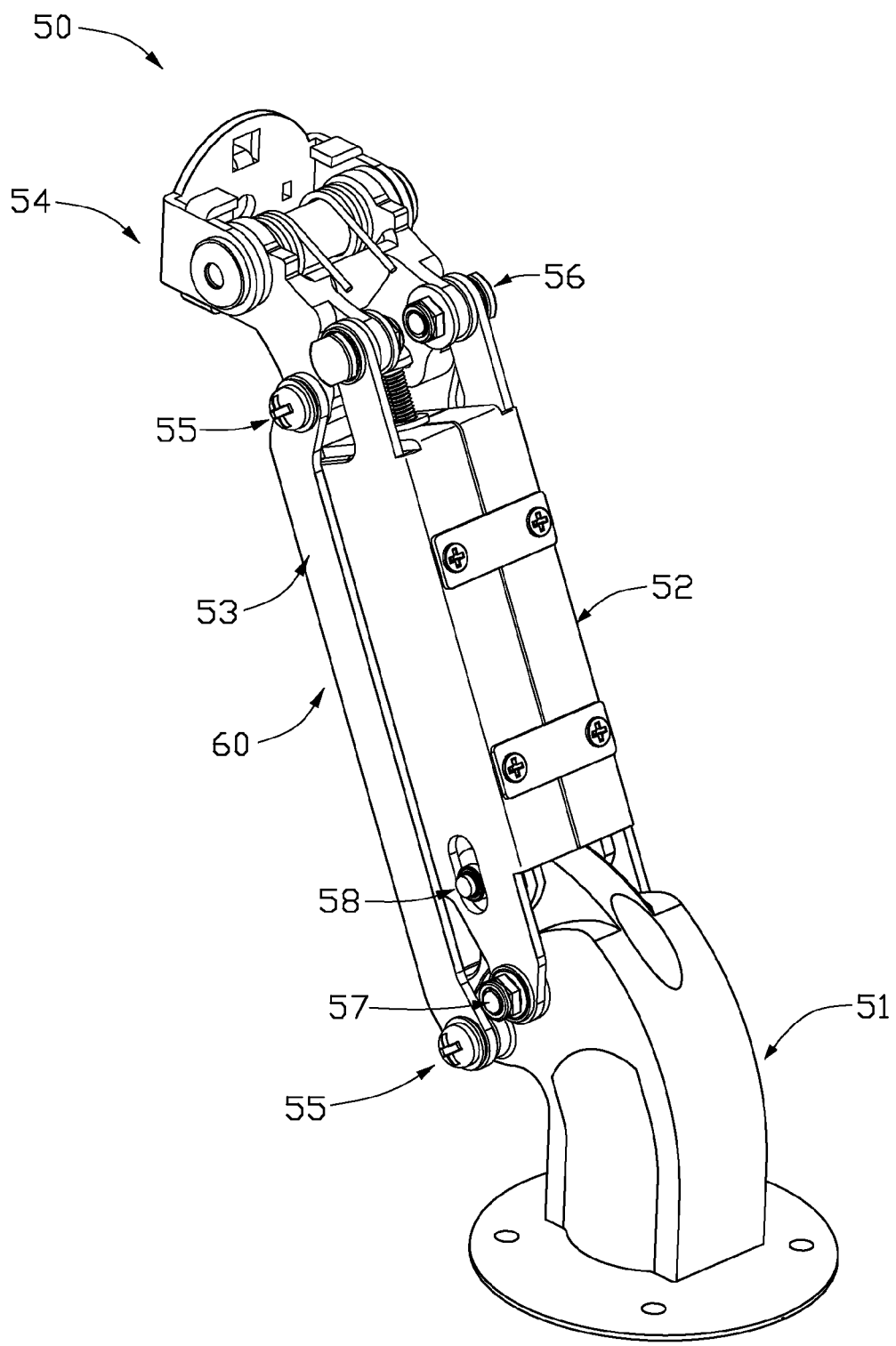
FIG. 1 is an assembled, isometric view of an embodiment of a support stand of a flat-panel display monitor, and the support stand including an adjustable mechanism.

Referring to FIG. 1, a support stand 50 for a flat-panel display monitor, includes a base member 51, a support mechanism 52 having a support bracket 521 and a resilient member 522, two link shafts 53, and an adjustable mechanism 54 configured for holding the flat-panel display monitor. A first end of the support bracket 521 and a first end of each shaft 53 are rotatably connected to the base member. A second end of the support bracket 521 and a second end of each link shaft 53 are rotatably connected to the adjustable mechanism 54. The resilient member 522 is configured to create an elastic force between the support mechanism 52 and the link shafts 53 so that a distance between the support mechanism 52 and the link shafts 53 tends to decrease.

Figure 2:
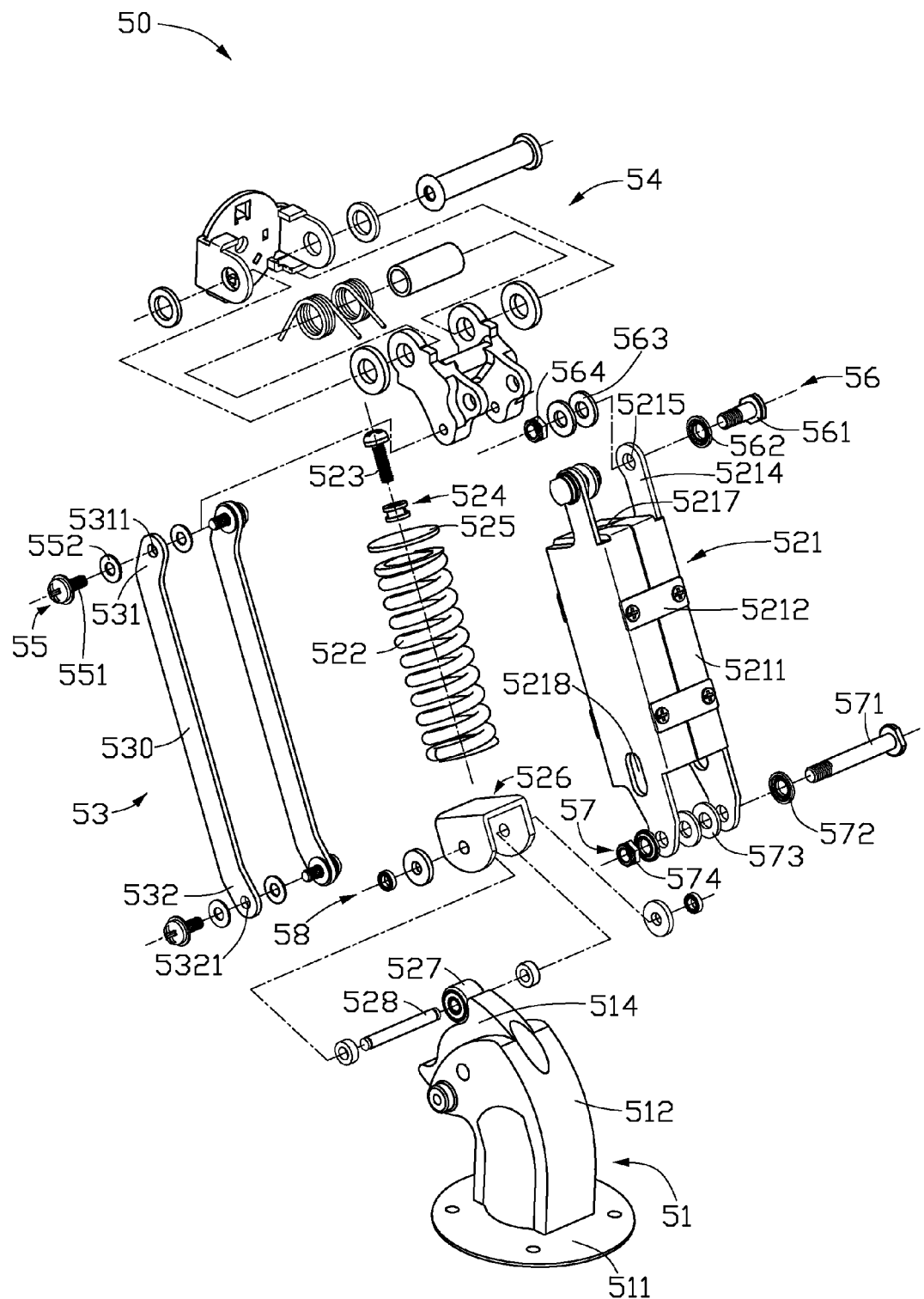
FIG. 2 is an exploded, isometric view of the support stand of FIG. 1.
Figure 3:
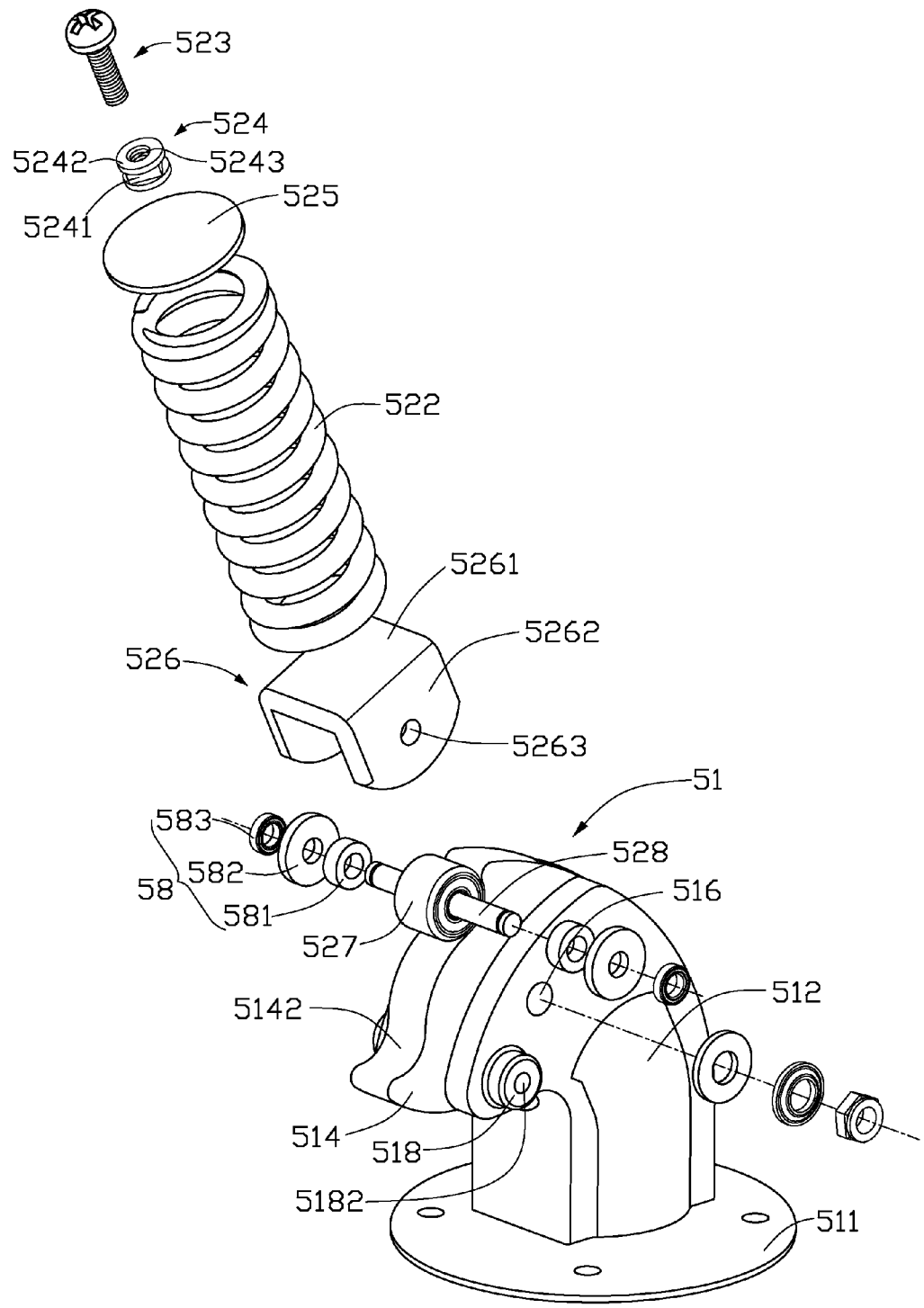
FIG. 3 is an enlarged, exploded, partial, isometric view of the support stand of FIG. 1.

Referring to FIGS. 2 and 3, the base member 51 includes a base portion 511, a main portion 512 positioned on the base portion 511, a mounting portion 514 formed at an end of the main portion 512, and two extending blocks 518 symmetrically formed at opposite sides of the main portion 512. The mounting portion 514 includes a cam surface 5142. The main portion 512 defines a pivot hole 516. Each extending block 518 defines a through hole 5182.

The support mechanism 52 includes the support bracket 521, the resilient member 522, an adjusting screw 523, a latching member 524, a pressing member 525, a block member 526, a rolling member 527, and a shaft 528.

The support bracket 521 includes two half support brackets 5211 and four connecting boards 5212. Each half support bracket 5211 includes two extending walls 5214 extending from opposite ends of each half support bracket 5211. Each extending wall 5214 defines a pivot hole 5215 at a distal end of the extending wall 5214. The four connecting boards 5212 are configured to connect the two half support brackets 5211 together, thereby forming the support bracket 521. The support bracket 521 includes a top wall (not labeled) formed at the first end of the support bracket 521, and positioned between the extending walls 5214 of the half support brackets 5211. The top wall defines a fixing hole 5217 for fixing the latching member 524. In another embodiment, the latching member 524 can be soldered to the support bracket 521 or integrally formed with the support bracket 521. The half support bracket 5211 and the top wall cooperatively define a cavity configured for receiving the resilient member 522, part of the latching member 524, the pressing member 525, the block member 526, the rolling member 527, and the shaft 528. Each half support bracket 5211 defines a sliding groove 5218 adjacent to an end of the extending wall 5214 away from the top wall.

The resilient member 522 may be a compression spring positioned between the pressing member 525 and the block member 526.

Referring to FIG. 3 again, the latching member 524 includes a main body 5241 and two flanges 5242 extending from opposite ends of the main body 5241. The latching member 524 defines a threaded hole 5243 extending through the main body 5241 and the flanges 5242. The adjusting screw 523 passes through the threaded hole 5243. The adjusting screw 523 and the latching member 524 cooperatively form an adjusting structure (not labeled).

The block member 526 includes a base wall 5261 and two side walls 5262 extending from opposite sides of the base wall 5261. Each side wall 5262 defines a pivot hole 5263.

The rolling member 527 may be cylindrical and defines a pivot hole (not labeled). The shaft 528 passes through the pivot hole.

The shaft 528 may be cylindrical and defines two latching grooves (not labeled). Each latching groove is adjacent to an end of the shaft 528.

Referring to FIG. 2 again, each link shaft 53 includes a shaft portion 530, a first link portion 531 formed at the first end of the link shaft 53, and a second link portion 532 formed at the second end of the link shaft 53. Each link shaft 53 defines a first mounting hole 5311 in the first link portion 531, and a second mounting hole 5321 in the second link portion 532.

Figure 4:
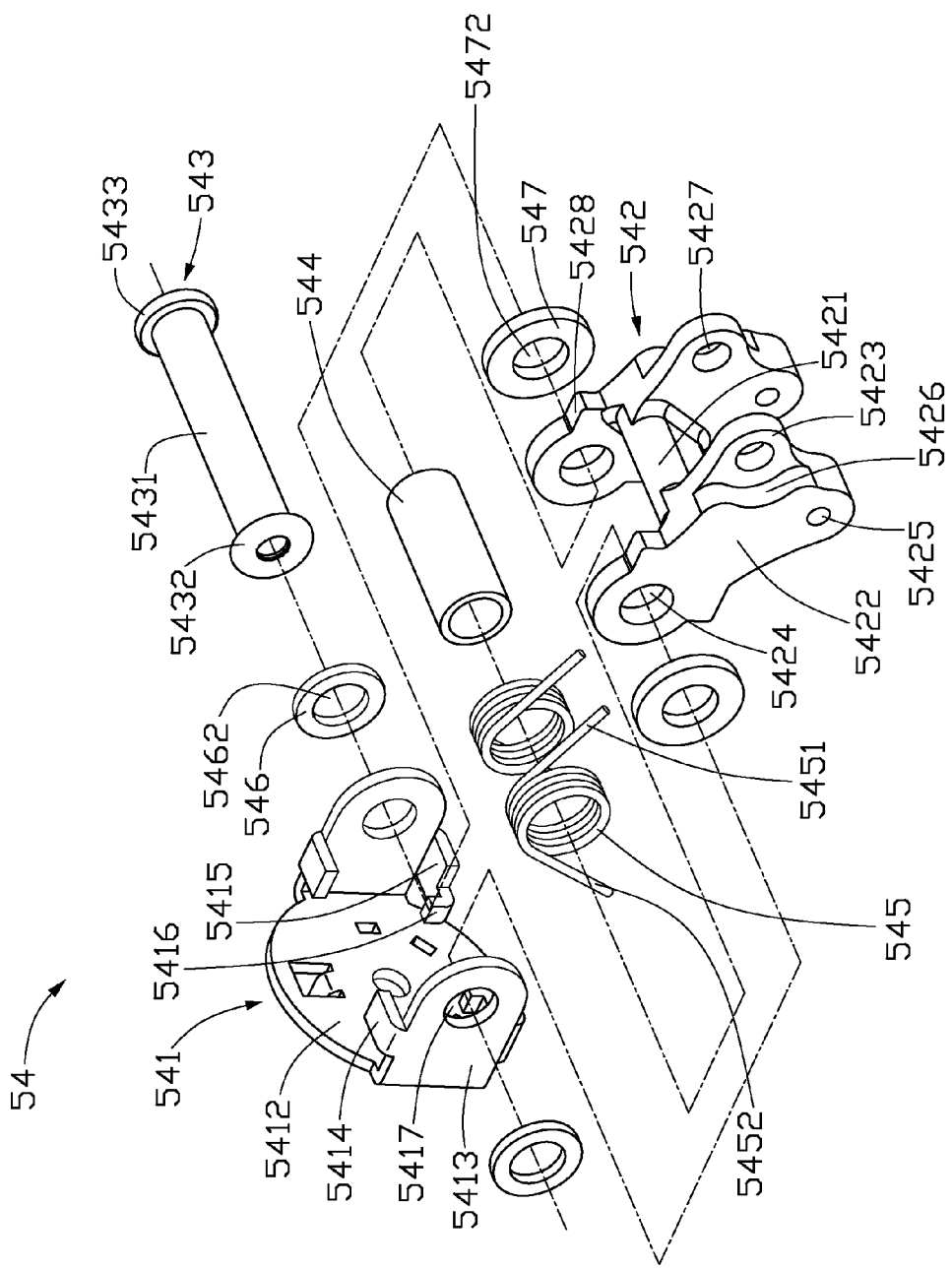
FIG. 4 is an exploded, isometric view of the adjustable mechanism of the support stand of FIG. 1.

Referring to FIG. 4, the adjustable mechanism 54 includes a rotatable bracket 541, a mounting bracket 542, a pivot shaft 543, a sleeve 544, two torsion springs 545, two friction washers 546, and two washers 547. The rotatable bracket 541 is configured for holding a flat-panel display monitor. The mounting bracket 542 is configured for connecting the support mechanism 52.

The rotatable bracket 541 includes a base board 5412 and two side boards 5413 perpendicularly extending from opposite sides of the base board 5412. Each side board 5413 includes a first restricting block 5414 perpendicularly extending from an upper side of the side board and a second restricting block 5415 perpendicularly extending from a lower side of the side board 5413. Each of the first restricting block 5414 and the second restricting block 5415 of a first of the side boards 5413 extends towards a second of the side boards 5413. The second restricting block 5415 includes a bent portion 5416 formed at an end of the second restricting block 5415. Each side board 5413 defines a pivot hole 5417 for the pivot shaft 543 to pass through.

The mounting bracket 542 includes a middle portion 5421, two side portions 5422 formed at opposite sides of the middle portion 5421, and a block 5423 extending from each side portion 5422. Each side portion 5422 includes two restricting protrusions 5428 formed at an upper end and a lower end of the side portion 5422. Each side portion 5422 defines a first pivot hole 5424 adjacent to the restricting protrusions 5428 and a second pivot hole 5425 opposite to the first pivot hole 5424. The thickness of the block 5423 is less than a thickness of the side portion 5422, thus forming a stepped surface 5426. The stepped surface is a curved surface. Each block 5423 defines a third pivot hole 5427.

The pivot shaft 543 includes a main shaft 5431, a first flange portion 5432, and a second flange portion 5433. The first and second flange portions 5432, 5433 are formed at opposite ends of the main shaft 5431. The first flange portion 5432 may be formed by bending a portion of the main shaft 5431.

The sleeve 544 may be a hollow cylinder. Each torsion spring 545 includes two latching ends 5451, 5452 extending from opposite ends of the torsion spring 545. A through hole 5462 is defined in a middle portion of each friction washer 546. A through hole 5472 is defined in a middle portion of each washer 547.

The support stand 50 further includes four first connecting modules 55, two second connecting modules 56, a third connecting module 57, and two fourth connecting modules 58. Each first connecting module 55 includes a screw 551 and two friction washers 552. Each second connecting module 56 includes a screw 561, a resilient washer 562, two friction washers 563, and a nut 564. The third connecting module 57 includes a screw 571, two resilient washers 572, two friction washers 573, and a nut 574. Each fourth connecting module 58 includes a washer 581, a friction washer 582, and two latching members 583.

Referring to FIGS. 1, 2 and 4 again, the support stand 50 may be assembled as follows. The torsion springs 545 are sleeved on the sleeve 544. An end of the pivot shaft 543 opposite to second flange portion 5433 is consecutively passed a first of the friction washers 546, a first of the pivot holes 5417 of the rotatable bracket 541, a first of the washers 547, a first of the first pivot holes 5424 of the mounting bracket 542, the sleeve 544, a second of the first pivot holes 5424 of the mounting bracket 542, a second of the washers 547, a second of the pivot hole 5417 of the rotatable bracket 541, and a second of the friction washers 546. The end of the pivot shaft 543 opposite to the second flange portion 5433 is riveted to form the first flange portion 5432. The latching ends 5451 of the torsion springs 545 abut the middle portion 5421 of the mounting bracket 542 and the latching ends 5452 of the torsion springs 545 correspondingly abut the bent portions 5416 of the second blocks 5415 of the rotatable bracket 541. Thus, the adjustable mechanism 54 is assembled. The first and second restricting blocks 5414, 5415 of the rotatable bracket 541 and the restricting protrusions 5428 of the mounting bracket 542 cooperatively limit a rotation of the rotatable bracket 541 relative to the mounting bracket 542 within in a determined range.

The support mechanism 52 may be assembled as follows. The half support brackets 5211 are connected together by the connecting boards 5212, thereby forming the support bracket 521. A first of the flanges 5242 of the latching member 524 and the main body 5241 are inserted into the support bracket 521, and a second of the flanges 5242 extends out of the support bracket 521. The pressing member 525, the resilient member 522, the block member 526, the rolling member 527, the washers 581, the friction washers 582 are consecutively placed in the support bracket 521. The shaft 528 is consecutively passed through the sliding groove 5218 of a first of the half support brackets 5211, a first of the friction washers 582, a first of the pivot holes 5263 of one side wall 5262 of the block member 526, a first of the washers 581, the rolling member 527, a second of the washers 581, the pivot hole 5263 of a second of the side walls 5262 of the block member 526, a second of the friction washers 582, and the sliding groove 5218 of a second of the half support brackets 5211. The latching members 583 are correspondingly latched in the latching grooves of the shaft 528 and received in the sliding groove 5218 of the half support brackets 5211. The adjusting screw 523 is screwed into the latching member 524. Thus, the support mechanism 52 is assembled. After the support mechanism 52 is assembled, an end of the adjusting screw 523 abuts the pressing member 525 and two ends of the resilient member 522 abut the pressing member 525 and the block member 526 correspondingly. A predetermined compression rate of the resilient member 522 can be adjusted by the adjusting screw 522.

The third connecting module 57 is assembled as follows. The screw 571 is consecutively passed through a first of the resilient washers 572, the pivot hole 5215 of a first of the extending walls 5214 of the support bracket 521, a first of the friction washers 573, the pivot hole 516 of the base member 51, a second of the friction washers 573, the pivot hole 5215 of a second of the extending walls 5214 of the support bracket 521, and a second of the resilient washers 572. The nut 574 is screwed on the screw 571. Thus, the support mechanism 52 is rotatably connected to the base member 51. After the third connecting module 57 is assembled, the rolling member 527 engages with the cam surface 5142 of the base member 51.

The second connecting modules 56 is assembled as follows. The screw 561 is consecutively passed through the resilient washer 562, the pivot hole 5215 of a first of the extending walls 5214 of the support bracket 521, a first of the friction washers 563, the third pivot hole 5427 of a first of the blocks 5423 of the mounting bracket 542, and a second of the friction washers 563. The nut 564 is screwed on the screw 561. Thus, one of the second connecting module 56 is assembled, and another second connecting module 56 is assembled similarly. After, the second connecting modules 56 are assembled, the support mechanism 52 is rotatably connected to the mounting bracket 542.

The first connecting module 55 is assembled to the mounting bracket 542 as follows. The screw 551 is consecutively passed through one of the friction washers 552, the mounting hole 5311 of the first link portion 531 of the link shaft 53, the second pivot hole 5425 of the mounting bracket 542, and another one of the friction washers 552. Then, one of the first connecting module 55 is assembled to the mounting bracket 542, another one of the first connecting module 55 is assembled to the mounting bracket 542 similarly, thus the first end of each link shaft 53 is connected to the mounting bracket 542. To assemble one of the first connecting module 55 to the base member 51, the screw 552 is consecutively passed through one of the friction washers 552, the mounting hole 5321 of the second link portion 531 of the link shaft 53, another one of the friction washers 552, and the through hole 5182 of the block 518 of the base member 51. Then, one of the first connecting module 55 is assembled to the base member 51, another one of the first connecting module 55 is assembled to the base member 51 similarly, thus the second end of each link shaft 53 is rotatably connected to the base member 51. After the four first connecting module 55 shafts 53 are assembled, the shafts 53, side walls (not labeled) and the extending walls 5214 of the half support brackets 5211, the mounting bracket 542, and the main portion 512 of the base member 51 cooperatively form two four-bar linkages 60 are achieved.

Figure 5:
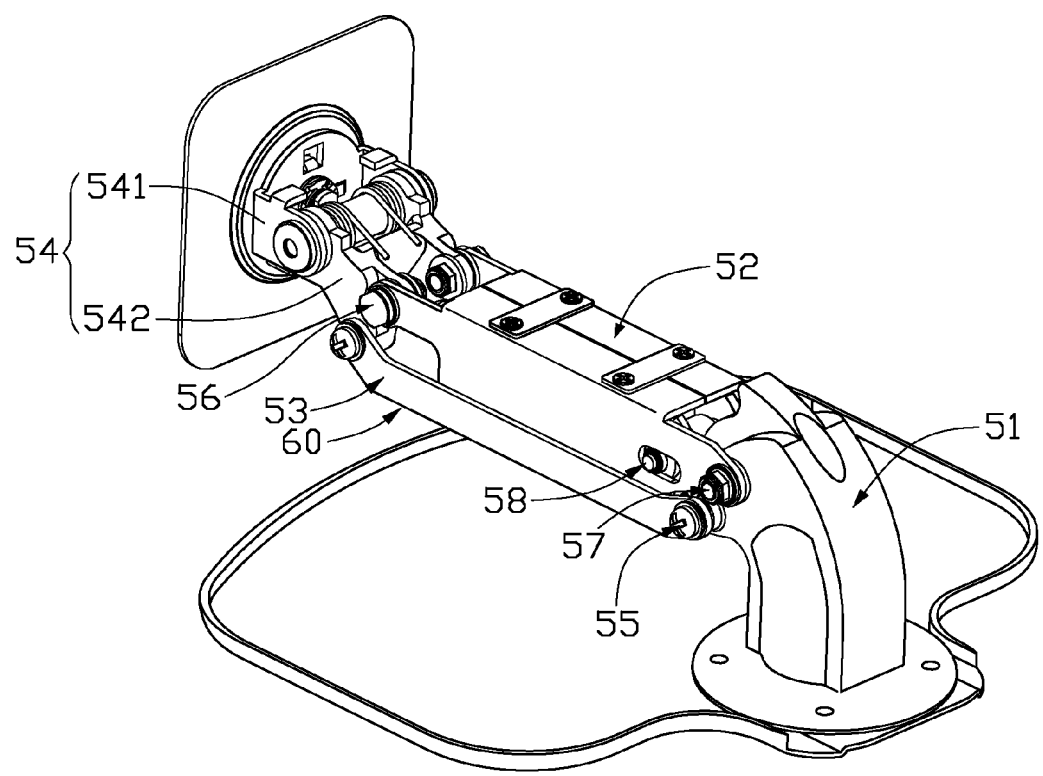
FIGS. 5-7 are assembled, isometric views similar to FIG. 1, but showing three different adjusting positions of the support stand.
Figure 6:
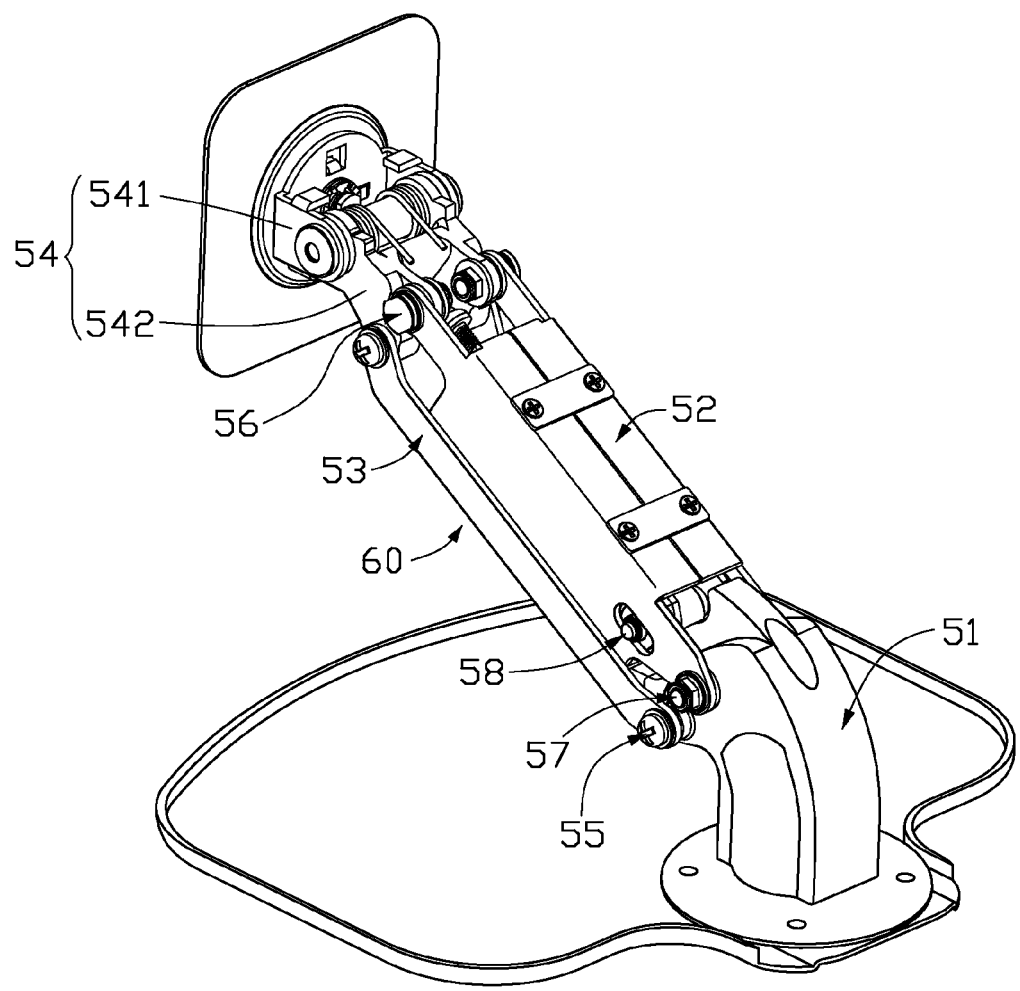
Figure 7:
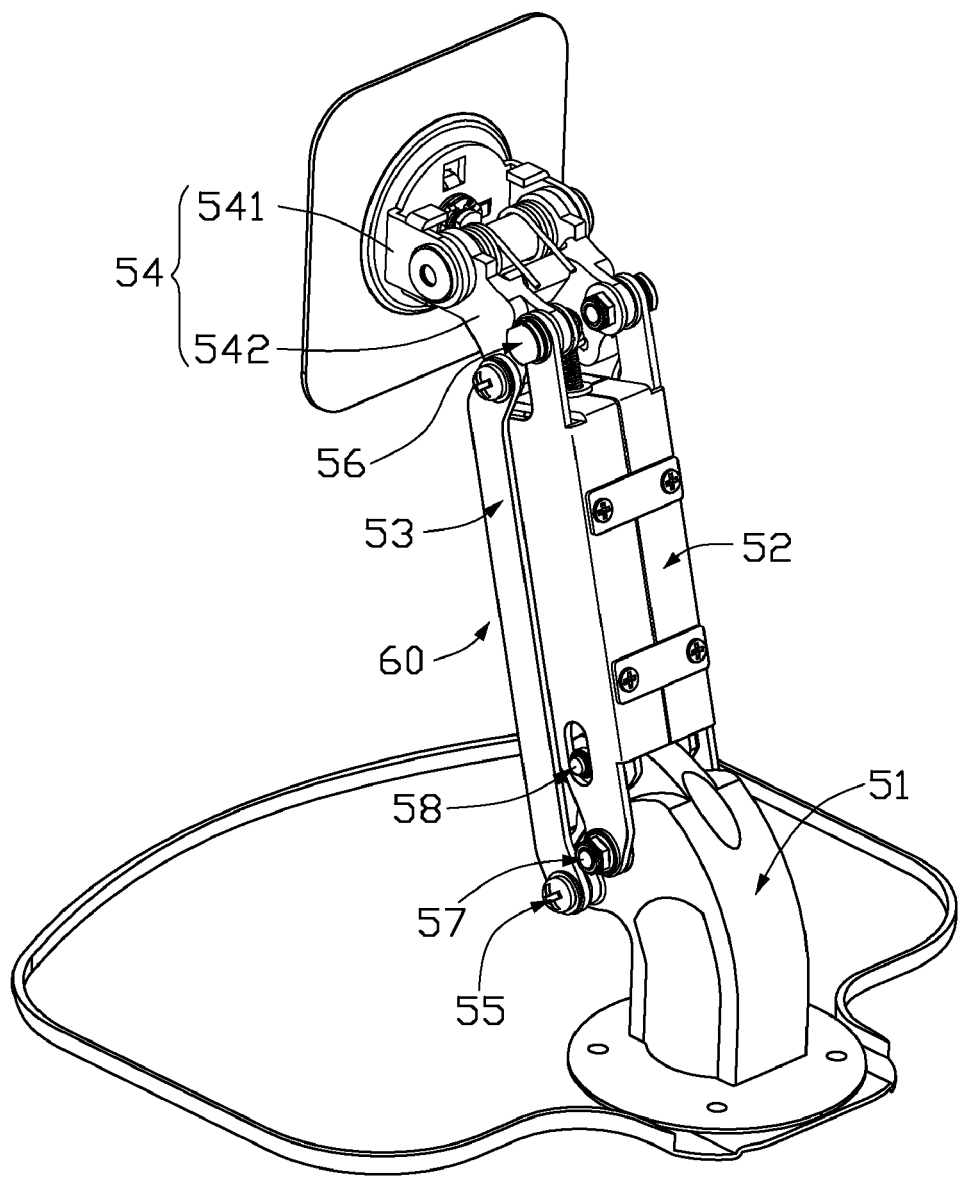

The support stand 50 may be fixed to a display body (not shown) of the flat-panel display monitor via the rotatable bracket 541. In FIG. 5, the support stand 50 is in a lower position, and the rolling member 527 abuts a bottom portion of the cam surface 5142. In FIGS. 6 and 7, the height of the rotatable bracket 541 with the display body may be increased by pushing the display body upwards so that the mounting bracket 542 is rotated relative to the rotatable bracket 541 and the support bracket 521 is rotated relative to the base member 51. As the height of the support stand 50 is increased, the rolling member 527 slides towards a top portion of the cam surface 5142 and the latching members 583 slide along the sliding grooves 5218.

The height of the flat-panel display monitor is changed by the four-bar linkages 60, but the viewing angle of the flat-panel display monitor has not changed. The flat-panel display monitor can be stably maintained at the predetermined height by friction created by components of the support stand 50. An adjusting angle defined by the support mechanism 52 and a horizontal surface is preferably in the range from about 0 degrees to about 65 degrees. The range of the adjusting angle can be adjusted by changing the diameter of the rolling member 527 and the shape of the cam surface 5142. Because the rolling member 527 slides smoothly along the cam surface 5142, the height of the flat-panel display monitor may be adjusted easily.

The viewing angle of the flat-panel display monitor is adjusted by applying a force on the display body to rotate the display body with the rotatable bracket 541 along an axis of the pivot shaft 543 relative to the mounting bracket 542, the base member 51, a support mechanism 52, and the link shafts 53. A torsion force of the torsion spring 545 either increases or decreases depending on the rotation of the rotatable bracket 541, thereby preventing an excessive force from damaging the adjustable mechanism 54. The mechanism 54 provides a predetermined amount of friction that allows movement of the display body relative to the mounting bracket 542, and also allows the display body to be stably maintained in a desired position relative to the mounting bracket 542.

An elastic force created by the resilient member 522 acts on the block member 526 so that the block member 526 pushes the shaft 528. As the shaft 528 is pushed, the rolling member 527 slides on the cam surface 5142. A distance between the support mechanism 52 and the link shafts 53 tends to decrease because of the elastic force created by the resilient member 522. As a result, the four-bar linkages 60 tend to be elevated. The flat-panel display monitor may be stably maintained at the predetermined height even when the friction created by components of the support stand 50 is relatively low, because the elastic force can balance the weight of the flat-panel display monitor.

The resilient member 522 may also be a torsion spring positioned between two parallel bars of the four-bar linkage. The torsion spring includes one end fixed to one of the bars and another end fixed to another one of the bars. The torsion spring creates an elastic force acting on the parallel bars. Thus, a distance between the parallel bars tends to decrease and the four-bar linkages tend to raise the flat-panel display monitor.

The resilient member 522 may also be a tension spring positioned between two parallel bars of the four-bar linkage. The tension spring includes one end fixed to one of the bars and another end fixed to another one of the bars. The tension spring creates an elastic force acting on the parallel bars. Thus, a distance between the parallel bars tends to decrease and the four-bar linkages tend to raise the flat-panel display monitor.

The elastic force created by the resilient member 522 can be adjusted by the adjusting screw 523 to compensate for flat-panel display monitors having different weights.

It is believed that the present embodiments and their advantages will be understood from the foregoing description, and it will be apparent that various changes may be made thereto without departing from the spirit and scope of the invention or sacrificing all of its material advantages, the examples hereinbefore described merely being exemplary embodiments of the invention.

What is claimed is:

1. A support stand for a flat-panel display monitor, comprising:
   a base member comprising a base portion, a main portion positioned on the base portion, and a mounting portion formed at an end of the main portion, wherein the main portion defines a pivot hole, the support bracket comprises two first extending walls formed at opposites sides of a first end, each first extending wall defines a pivot hole; the support stand further comprises a connecting module; the connecting module engages in the pivot holes of the first extending walls and the pivot hole of the main portion so that the support bracket is rotatably connected to the base member;
a support mechanism comprising a support bracket and a resilient member, wherein the support bracket defines two sliding grooves at opposite sides;
two link shafts; and
an adjustable mechanism configured for holding the flat-panel display monitor;
wherein, a first end of the support bracket and a first end of each shaft are rotatably connected to the base member; a second end of the support bracket and a second end of each link shaft are rotatably connected to the adjustable mechanism; the resilient member is configured to create an elastic force between the support mechanism and the link shafts so that a distance between the support mechanism and the link shafts tends to decrease; the support mechanism further comprises an adjusting screw, a latching member defining a threaded hole, a pressing member, a block member, a rolling member, and a shaft; the latching member is fixed to the first end of the support bracket; the adjusting screw is screwed in the threaded hole to abut the pressing member; the resilient member is positioned between the pressing member and the block member; the block member is fixed to the support bracket adjacent to the second end, and comprises a base wall and two side walls extending from opposite sides of the base wall, each side wall defines a pivot hole; the rolling member is positioned between the side walls of the block member and rotatably connected to the block member, the shaft is passed through a first of the sliding grooves of the support bracket, the pivot hole of a first of the side walls of the block member, the rolling member, the pivot hole of a second of the side walls of the block member, and a second of the sliding grooves of the support bracket.

2. The support stand of claim 1, wherein the base member further comprises two extending blocks formed at opposite sides of the main portion, each extending block defines a through hole; the first end of the link shaft defines a mounting hole, the support stand further comprises two connecting modules; each connecting module engages in the through hole of each extending block and the mounting hole of each link shaft so that each link shaft is rotatably connected to the base member.

3. The support stand of claim 2, wherein the adjustable mechanism comprises a mounting bracket comprising a middle portion, two side portions formed at opposite sides of the middle portion, and a block extending from each side portion; each side portion defines a first pivot hole and each block defines a second pivot hole; a second end of the link shaft defines a mounting hole; the support bracket comprises two second extending walls formed at opposites side of the second end opposite to the first end, each second extending wall defines a pivot hole; the support stand further comprises two first connecting modules and two second connecting modules; each first connecting module engages in the mounting hole of the second end of each link shaft and each first pivot hole of the mounting bracket; each second connecting module engages in each pivot hole of the second end of the support bracket and each second pivot hole of the mounting bracket.

4. The support stand of claim 3, wherein the adjustable mechanism further comprises a rotatable bracket rotatably connected to the mounting bracket, the rotatable bracket comprises a base board and two side boards extending from opposite sides of the base board; each side board of the rotatable bracket comprises a first restricting block extending from an upper side of the side board and a second restricting block extending from a lower side of the side board; each side portion of the mounting bracket comprises two restricting protrusions formed at an upper end and a lower end of the side portion; the first and second restricting blocks of the rotatable bracket and the restricting protrusions of the mounting bracket cooperatively limit a rotation of the rotatable bracket and the mounting bracket within a determined range.

5. The support stand of claim 4, wherein the adjustable mechanism further comprises two torsion springs and a shaft; each side board of the rotatable bracket defines a pivot hole for the pivot shaft to pass through, each side portion of the mounting bracket defines a third pivot hole adjacent to the restricting protrusions; each second restricting block of the rotatable bracket comprises a bent portion formed at an end; the torsion springs are sleeved on the shaft; a first end of the shaft engages in a first of the pivot holes of the rotatable bracket and a first of the third pivot holes of the mounting bracket, a second end of the shaft engages in a second of the pivot holes of the rotatable bracket and a second of the third pivot holes of the mounting bracket.

6. The support stand of claim 5, wherein each torsion spring comprises a first latching end and a second latching end extending from opposite ends of the torsion spring; the first latching ends of the torsion springs abut the middle portion of the mounting bracket; the second latching ends of the torsion springs abut the bent portions of the second blocks of the rotatable bracket.

7. The support stand of claim 1, wherein the mounting portion of the base member further comprises a cam surface; the rolling member is capable of sliding on the cam surface.

8. The support stand of claim 1, wherein the resilient member is a compression spring.

9. A support stand for a flat-panel display monitor, comprising:
a support mechanism comprising a support bracket and a resilient member positioned in the support bracket, wherein the support bracket defines two sliding grooves at opposite sides;
two link shafts, wherein the resilient member is configured to create an elastic force between the support mechanism and the link shafts so that a distance between the support mechanism and the link shafts tends to decrease;
an adjustable mechanism rotatably connected to a first end of each link shaft and a first end of the support bracket, and configured for holding the flat-panel display monitor;
a base member rotatably connected to a second end of each link shaft and a second end of the support bracket, the base member comprising a base portion, a main portion positioned on the base portion, and a mounting portion formed at an end of the main portion, wherein the main portion defines a pivot hole, the support bracket comprises two first extending walls formed at opposites sides of a first end, each first extending wall defines a pivot hole; the support stand further comprises a connecting module; the connecting module engages in the pivot holes of the first extending walls and the pivot hole of the main portion so that the support bracket is rotatably connected to the base member; and an adjusting member abutting the resilient member and configured for adjusting the elastic force created by the resilient member wherein the support mechanism further comprises an adjusting screw, a latching member defining a threaded hole, a pressing member, a block member, a rolling member, and a shaft; the latching member is fixed to the first end of the support bracket; the adjusting screw is screwed in the threaded hole to abut the pressing member; the resilient member is positioned between the pressing member and the block member; the block member is fixed to the support bracket adjacent to the second end, and comprises a base wall and two side walls extending from opposite sides of the base wall, each side wall defines a pivot hole; the rolling member is positioned between the side walls of the block member and rotatably connected to the block member, the shaft is passed through a first of the sliding grooves of the support bracket, the pivot hole of a first of the side walls of the block member, the rolling member, the pivot hole of a second of the side walls of the block member, and a second of the sliding grooves of the support bracket.

10. The support stand of claim 9, wherein the base member comprises two extending blocks formed at opposite sides of the main portion, each extending block defines a through hole, and a first end of the link shaft defines a mounting hole, the support stand further comprises two connecting modules, each connecting module engages in the through hole of each extending block and the mounting hole of each link shaft so that the link shafts are rotatably connected to the base member.

11. The support stand of claim 10, wherein the adjustable mechanism comprises a mounting bracket, the mounting bracket comprises a middle portion, two side portions formed at opposite sides of the middle portion, and two blocks extending from the sides portions, each side portion defines a first pivot hole and each block defines a second pivot hole; the second of each link shaft defines a mounting hole; the support bracket comprises two second extending walls formed at opposites sides of the second end opposite to the first end, each second extending wall defines a pivot hole; the support stand further comprises two first connecting modules and two second connecting modules; each first connecting module engages in the mounting hole of the second end of each link shaft and each first pivot hole of the mounting bracket; each second connecting module engages in each pivot hole of the second end of the support bracket and each second pivot hole of the mounting bracket.

12. The support stand of claim 11, wherein the adjustable mechanism further comprises a rotatable bracket rotatably connected to the mounting bracket, the rotatable bracket comprises a base board and two side boards extending from opposite sides of the base board; each side board of the rotatable bracket comprises a first restricting block extending from an upper side of the side board and a second restricting block extending from a lower side of the side board; each side portion of the mounting bracket comprises two restricting protrusions formed at an upper end and a lower end of the side portion; the first and second restricting blocks of the rotatable bracket and the restricting protrusions of the mounting bracket cooperatively limit a rotation of the rotatable bracket and the mounting bracket within a determined range.

13. A support stand for a flat-panel display monitor, comprising:
a base member;
a support mechanism comprising a support bracket and a resilient member, wherein the support bracket defines two sliding grooves at opposite sides;
two link shafts; and
an adjustable mechanism configured for holding the flat-panel display monitor;
wherein a first end of the support bracket and a first end of each shaft are rotatably connected to the base member; a second end of the support bracket and a second end of each link shaft are rotatably connected to the adjustable mechanism; the resilient member is configured to create an elastic force between the support mechanism and the link shafts so that a distance between the support mechanism and the link shafts tends to decrease; the support mechanism further comprises an adjusting screw, a latching member defining a threaded hole, a pressing member, a block member, a rolling member, and a shaft; the latching member is fixed to the first end of the support bracket; the adjusting screw is screwed in the threaded hole to abut the pressing member; the resilient member is positioned between the pressing member and the block member; the block member is fixed to the support bracket adjacent to the second end, and comprises a base wall and two side walls extending from opposite sides of the base wall, each side wall defines a pivot hole; the rolling member is positioned between the side walls of the block member and rotatably connected to the block member, the shaft is passed through a first of the sliding grooves of the support bracket, the pivot hole of a first of the side walls of the block member, the rolling member, the pivot hole of a second of the side walls of the block member, and a second of the sliding grooves of the support bracket.

* * * * *

US008011632C1

(12) INTER PARTES REEXAMINATION CERTIFICATE (777th)

United States Patent
Wang et al.

(10) Number: US 8,011,632 C1
(45) Certificate Issued: Dec. 24, 2013

(54) SUPPORT STAND FOR FLAT-PANEL DISPLAY MONITOR

(75) Inventors: Jin-Xin Wang, Shenzhen (CN); Jian Li, Shenzhen (CN); Zhi-Guo Sun, Shenzhen (CN)

(73) Assignees: Hong Fu Jin Precision Industry (Shenzhen) Co., Ltd., Longhua Town, Bao' An District Shenzhen, Guangdong Province (CN); Hon Hai Precision Industry Co., Ltd., Tu-Cheng, Taipei Hsien (TW)

Reexamination Request:
No. 95/002,218, Sep. 13, 2012

Reexamination Certificate for:
Patent No.: 8,011,632
Issued: Sep. 6, 2011
Appl. No.: 12/200,434
Filed: Aug. 28, 2008

(30) Foreign Application Priority Data

Dec. 28, 2007 (CN) .......................... 2007 1 0203541

(51) Int. Cl.
*E04G 3/00* (2006.01)

(52) U.S. Cl.
USPC .... 248/284.1; 248/917; 248/920; 361/679.06

(58) Field of Classification Search
None
See application file for complete search history.

(56) References Cited

To view the complete listing of prior art documents cited during the proceeding for Reexamination Control Number 95/002,218, please refer to the USPTO's public Patent Application Information Retrieval (PAIR) system under the Display References tab.

*Primary Examiner* — William Doerrler

(57) ABSTRACT

A support stand for a flat-panel display monitor comprises a base member, a support mechanism, two link shafts, and an adjustable mechanism. The support mechanism comprises a support bracket and a resilient member positioned in the support bracket. The adjustable mechanism is configured for holding the flat-panel display monitor. A first end of the support bracket and first end of each shaft are rotatably connected to the base member. An second end of the support bracket and a second end of each link shaft are rotatably connected to the adjustable mechanism. The resilient member is configured to create an elastic force between the support mechanism and the link shafts so that a distance between the support mechanism and the link shafts tends to decrease.

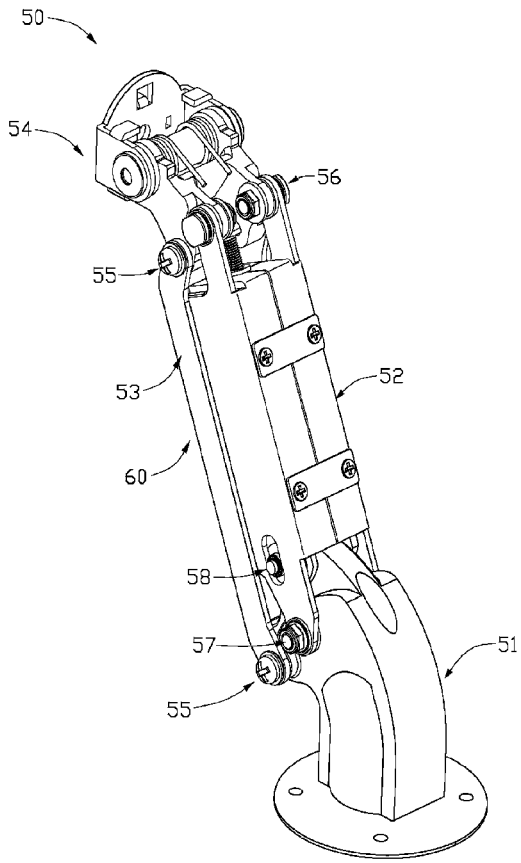

US 8,011,632 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 11 are cancelled.

Claims 1, 4, 9, 12 and 13 are determined to be patentable as amended.

Claims 2, 5-8 and 10, dependent on an amended claim, are determined to be patentable.

1. A support stand for a flat-panel display monitor, comprising:
a base member comprising a base portion, a main portion positioned on the base portion, and a mounting portion formed at an end of the main portion, wherein the main portion defines a pivot hole,
*a support mechanism comprising a support bracket and a resilient member, wherein the support bracket defines two sliding grooves at opposite sides,* the support bracket comprises two first extending walls formed at opposites sides of a first end, each first extending wall defines a pivot hole; the support stand further comprises a connecting module; the connecting module engages in the pivot holes of the first extending walls and the pivot hole of the main portion so that the support bracket is rotatably connected to the base member;
[a support mechanism comprising a support bracket and a resilient member, wherein the support bracket defines two sliding grooves at opposite sides;]
two link shafts; and
an adjustable mechanism configured for holding the flat-panel display monitor;
wherein, a first end of the support bracket and a first end of each *link* shaft are rotatably connected to the base member; a second end of the support bracket and a second end of each link shaft are rotatably connected to the adjustable mechanism; the resilient member is configured to create an elastic force between the support mechanism and the link shafts so that a distance between the support mechanism and the link shafts tends to decrease; the support mechanism further comprises an adjusting screw, a latching member defining a threaded hole, a pressing member, a block member, a rolling member, and a shaft; the latching member is fixed to the first end of the support bracket; the adjusting screw is screwed in the threaded hole to abut the pressing member; the resilient member is positioned between the pressing member and the block member; the block member is fixed to the support bracket adjacent to the second end, and comprises a base wall and two side walls extending from opposite sides of the base wall, each side wall defines a pivot hole; the rolling member is positioned between the side walls of the block member and rotatably connected to the block member, the shaft is passed through a first of the sliding grooves of the support bracket, the pivot hole of a first of the side walls of the block member, the rolling member, the pivot hole of a second of the side walls of the block member, and a second of the sliding grooves of the support bracket, *the adjustable mechanism comprises a mounting bracket comprising a middle portion, two side portions formed at opposite sides of the middle portion, and a block extending from each side portion; each side portion defines a first pivot hole and each block defines a second pivot hole; the second end of each link shaft defines a mounting hole; the support bracket comprises two second extending walls formed at opposites side of the second end opposite to the first end, each second extending wall defines a pivot hole; the support stand further comprises two first connecting modules and two second connecting modules; each first connecting module engages in the mounting hole of the second end of each link shaft and each first pivot hole of the mounting bracket; each second connecting module engages in each pivot hole of the second end of the support bracket and each second pivot hole of the mounting bracket.*

4. The support stand of claim [3] *2*, wherein the adjustable mechanism further comprises a rotatable bracket rotatably connected to the mounting bracket, the rotatable bracket comprises a base board and two side boards extending from opposite sides of the base board; each side board of the rotatable bracket comprises a first restricting block extending from an upper side of the side board and a second restricting block extending from a lower side of the side board; each side portion of the mounting bracket comprises two restricting protrusions formed at an upper end and a lower end of the side portion; the first and second restricting blocks of the rotatable bracket and the restricting protrusions of the mounting bracket cooperatively limit a rotation of the rotatable bracket and the mounting bracket within a determined range.

9. A support stand for a flat-panel display monitor, comprising:
a support mechanism comprising a support bracket and a resilient member positioned in the support bracket, wherein the support bracket defines two sliding grooves at opposite sides;
two link shafts, wherein the resilient member is configured to create an elastic force between the support mechanism and the link shafts so that a distance between the support mechanism and the link shafts tends to decrease;
an adjustable mechanism rotatably connected to a first end of each link shaft and a first end of the support bracket, and configured for holding the flat-panel display monitor;
a base member rotatably connected to a second end of each link shaft and a second end of the support bracket, the base member comprising a base portion, a main portion positioned on the base portion, and a mounting portion formed at an end of the main portion, wherein the main portion defines a pivot hole, the support bracket comprises two first extending walls formed at opposites sides of a first end, each first extending wall defines a pivot hole; the support stand further comprises a connecting module; the connecting module engages in the pivot holes of the first extending walls and the pivot hole of the main portion so that the support bracket is rotatably connected to the base member; and
an adjusting member abutting the resilient member and configured for adjusting the elastic force created by the resilient member
wherein the support mechanism further comprises an adjusting screw, a latching member defining a threaded hole, a pressing member, a block member, a rolling member, and a shaft; the latching member is fixed to the first end of the support bracket; the adjusting screw is screwed in the threaded hole to abut the pressing member; the resilient member is positioned between the pressing member and the block member; the block member is fixed to the support bracket adjacent to the second end, and comprises a base wall and two side walls extending from opposite sides of the base wall, each side wall defines a pivot hole; the rolling member is positioned between the side walls of the block member and rotatably connected to the block member, the shaft is passed through a first of the sliding grooves of the support bracket, the pivot hole of a first of the side walls of the block member, the rolling member, the pivot hole of a second of the side walls of the block member, and a second of the sliding grooves of the support bracket, *the adjustable mechanism comprises a mounting bracket comprising a middle portion, two side portions formed at opposite sides of the middle portion, and a block extending from each side portion; each side portion defines a first pivot hole and each block defines a second pivot hole; the second end of each link shaft defines a mounting hole; the support bracket comprises two second extending walls formed at opposites side of the second end opposite to the first end, each second extending wall defines a pivot hole; the support stand further comprises two first connecting modules and two second connecting modules; each first connecting module engages in the mounting hole of the second end of each link shaft and each first pivot hole of the mounting bracket; each second connecting module engages in each pivot hole of the second end of the support bracket and each second pivot hole of the mounting bracket.*

12. The support stand of claim [11] *10*, wherein the adjustable mechanism further comprises a rotatable bracket rotatably connected to the mounting bracket, the rotatable bracket comprises a base board and two side boards extending from opposite sides of the base board; each side board of the rotatable bracket comprises a first restricting block extending from an upper side of the side board and a second restricting block extending from a lower side of the side board; each side portion of the mounting bracket comprises two restricting protrusions formed at an upper end and a lower end of the side portion; the first and second restricting blocks of the rotatable bracket and the restricting protrusions of the mounting bracket cooperatively limit a rotation of the rotatable bracket and the mounting bracket within a determined range.

13. A support stand for a flat-panel display monitor, comprising:

a base member;
a support mechanism comprising a support bracket and a resilient member, wherein the support bracket defines two sliding grooves at opposite sides;
two link shafts; and
an adjustable mechanism configured for holding the flat-panel display monitor;
wherein a first end of the support bracket and a first end of each shaft are rotatably connected to the base member; a second end of the support bracket and a second end of each link shaft are rotatably connected to the adjustable mechanism; the resilient member is configured to create an elastic force between the support mechanism and the link shafts so that a distance between the support mechanism and the link shafts tends to decrease; the support mechanism further comprises an adjusting screw, a latching member defining a threaded hole, a pressing member, a block member, a rolling member, and a shaft; the latching member is fixed to the first end of the support bracket; the adjusting screw is screwed in the threaded hole to abut the pressing member; the resilient member is positioned between the pressing member and the block member; the block member is fixed to the support bracket adjacent to the second end, and comprises a base wall and two side walls extending from opposite sides of the base wall, each side wall defines a pivot hole; the rolling member is positioned between the side walls of the block member and rotatably connected to the block member, the shaft is passed through a first of the sliding grooves of the support bracket, the pivot hole of a first of the side walls of the block member, the rolling member, the pivot hole of a second of the side walls of the block member, and a second of the sliding grooves of the support bracket, *the adjustable mechanism comprises a mounting bracket comprising a middle portion, two side portions formed at opposite sides of the middle portion, and a block extending from each side portion; each side portion defines a first pivot hole and each block defines a second pivot hole; the second end of each link shaft defines a mounting hole; the support bracket comprises two second extending walls formed at opposites side of the second end opposite to the first end, each second extending wall defines a pivot hole; the support stand further comprises two first connecting modules and two second connecting modules; each first connecting module engages in the mounting hole of the second end of each link shaft and each first pivot hole of the mounting bracket; each second connecting module engages in each pivot hole of the second end of the support bracket and each second pivot hole of the mounting bracket.*

\* \* \* \* \*